United States Patent
Briggs et al.

(10) Patent No.: US 10,129,932 B2
(45) Date of Patent: Nov. 13, 2018

(54) SENSING ELEMENT

(71) Applicant: PPG INDUSTRIES OHIO, INC., Cleveland, OH (US)

(72) Inventors: Michael D. Briggs, Owens Cross Roads, AL (US); Robert A. Drensek, Huntsville, AL (US); Stephen J. Molmer, Huntsville, AL (US); Andrew T. Troller, Huntsville, AL (US)

(73) Assignee: PPG Industries Ohio, Inc., Cleveland, OH (US)

(*) Notice: Subject to any disclaimer, the term of this patent is extended or adjusted under 35 U.S.C. 154(b) by 218 days.

(21) Appl. No.: 14/746,882

(22) Filed: Jun. 23, 2015

(65) Prior Publication Data
US 2016/0381734 A1  Dec. 29, 2016

(51) Int. Cl.
| H05B 3/06 | (2006.01) |
| H05B 3/16 | (2006.01) |
| H05B 3/86 | (2006.01) |
| G01K 1/14 | (2006.01) |
| G01K 7/16 | (2006.01) |
| G01K 13/00 | (2006.01) |

(52) U.S. Cl.
CPC ............... H05B 3/86 (2013.01); G01K 1/14 (2013.01); G01K 7/16 (2013.01); G01K 13/00 (2013.01)

(58) Field of Classification Search
CPC . G01K 13/00; G01K 1/14; G01K 7/16; H05B 3/845; H05B 3/20; H05B 3/22; H05B 3/24; H05B 3/26; H05B 3/28–3/681

USPC .................................. 219/522, 542–548
See application file for complete search history.

(56) References Cited

U.S. PATENT DOCUMENTS

| 3,789,191 A | 1/1974 | Spindler |
| 3,789,192 A | 1/1974 | Spindler |
| 4,755,659 A * | 7/1988 | Leon ................ B32B 17/10018 219/203 |
| 5,432,322 A * | 7/1995 | Ingram .................. A61F 7/007 219/528 |
| 5,677,662 A * | 10/1997 | Bresolin ................. H05B 3/14 338/22 R |
| 6,774,342 B2 * | 8/2004 | Capriotti ................. H05B 3/84 219/203 |
| 2004/0112663 A1 * | 6/2004 | Kocher ............... B60R 21/0136 180/274 |

FOREIGN PATENT DOCUMENTS

GB         1401497        7/1975

* cited by examiner

*Primary Examiner* — Sang Y Paik
(74) *Attorney, Agent, or Firm* — Neil J. Friedrich

(57) ABSTRACT

A sensing element for sensing a temperature of an electrically heated window includes a coil of filament wire having a first end and a second end, the coil having a resistivity that changes based on temperature, a first substantially flat conductive material electrically coupled to the first end of the coil, a second substantially flat conductive material electrically coupled to the second end of the coil, a first lead wire electrically coupled to the first substantially flat conductive material and extending outwardly, and a second lead wire electrically coupled to the second substantially flat conductive material and extending outwardly.

20 Claims, 2 Drawing Sheets

SENSING ELEMENT

BACKGROUND OF THE INVENTION

Field of the Invention

The present invention relates to temperature sensing elements and, in particular, a temperature sensing element for sensing a temperature of an electrically heated window.

Description of Related Art

Existing sensors for use in heated windows are prone to failure from stress and other vulnerabilities. Use of such sensors in aircraft windows exposes the sensors and the components thereof to extreme changes in temperature and other conditions that lead to premature failure. As an example, solder joints are often subject to considerable stress and tend to loosen. Without a reliable temperature sensor, the temperature of a heated window cannot be properly regulated and ice and/or fog can form. Accordingly, there is a need for a more reliable temperature sensor that overcomes some or all of the technical problems of the prior art.

SUMMARY OF THE INVENTION

Generally, provided is an improved sensing element for sensing the temperature of an electrically heated window that overcomes some or all of the drawbacks of the prior art.

A sensing element senses a temperature of an electrically heated window. The sensing element comprises: a coil of filament having a first end and a second end, the coil having a resistivity that changes based on temperature; a first substantially flat conductive material electrically coupled to the first end of the coil; a second substantially flat conductive material electrically coupled to the second end of the coil; a first lead wire electrically coupled to the first substantially flat conductive material and extending outwardly; and a second lead wire electrically coupled to the second substantially flat conductive material and extending outwardly.

A heated window assembly comprises: a first transparent material, a second transparent material, and a transparent interlayer disposed between the first transparent material and the second transparent material, wherein at least one of the interlayer, the first transparent material, and the second transparent material comprises an electrically conductive material adapted to generate heat when electricity is applied; and a sensing element disposed between the first transparent material and the second transparent material, the sensing element comprising two electrical leads, a filament having a resistivity that changes based on a temperature, and two portions of a substantially flat conductive material, wherein the filament comprises a first end and a second end, wherein the first end and the second end of the filament are each electrically coupled to one of the portions of substantially flat conductive material, and wherein each of the two electrical leads is electrically coupled to a portion of the substantially flat conductive material.

A sensing element for sensing a temperature of an electrically heated window includes a top layer, a bottom layer, and a coil of filament disposed between the top layer and the bottom layer, the coil of filament having a first end and a second end, wherein a resistivity of the coil of filament changes based on temperature. The sensing element further includes a first lead electrically connected to the first end of the coil of filament, the first lead comprising a first portion disposed between the top layer and the bottom layer, and a second portion external to the top layer and bottom layer, wherein the first portion comprises a bend. The sensing element also includes a second lead electrically connected to the second end of the coil of filament, the second lead comprising a first portion disposed between the top layer and the bottom layer, and a second portion external to the top layer and bottom layer, wherein the first portion comprises a bend.

A summary of the present invention is provided in the following numbered clauses:

Clause 1: A sensing element for sensing a temperature of an electrically heated window, comprising: a coil of filament having a first end and a second end, the coil having a resistivity that changes based on temperature; a first substantially flat conductive material electrically coupled to the first end of the coil; a second substantially flat conductive material electrically coupled to the second end of the coil; a first lead wire electrically coupled to the first substantially flat conductive material and extending outwardly; and a second lead wire electrically coupled to the second substantially flat conductive material and extending outwardly.

Clause 2: The sensing element of clause 1, wherein the coil of filament is wrapped around a winding card, and wherein the winding card is disposed between two pieces of a second material.

Clause 3: The sensing element of clause 2, wherein the second material comprises acrylic.

Clause 4: The sensing element of clauses 2 or 3, further comprising at least one spacer adjacent the winding card and parallel to the coil of filament wire, the at least one spacer disposed between the two pieces of the second material, wherein a portion of the first lead wire and a portion of the second lead wire are anchored to the at least one spacer.

Clause 5: The sensing element of any of clauses 1 to 4, wherein the first lead wire and the second lead wire each comprise a bend, such that the first lead wire and the second lead wire each extend from the sensing element substantially perpendicularly to the coil of filament wire.

Clause 6: The sensing element of clause 5, wherein the bend is disposed between two pieces of a second material that encompass the coil of filament wire.

Clause 7: The sensing element of clauses 5 or 6, wherein the bend is substantially 90 degrees.

Clause 8: The sensing element of any of clauses 1 to 7, wherein the first substantially flat conductive material and the second substantially flat conductive material comprise conductive foil.

Clause 9: The sensing element of clause 8, wherein the conductive foil comprises CuNi foil.

Clause 10: The sensing element of any of clauses 1 to 9, wherein the coil of filament comprises a filament wire having a diameter between 0.0015 inches and 0.0018 inches (0.0038 cm and 0.0046 cm).

Clause 11: A heated window assembly, comprising: a first transparent material; a second transparent material; a transparent interlayer disposed between the first transparent material and the second transparent material, wherein at least one of the interlayer, the first transparent material, and the second transparent material comprises an electrically conductive material adapted to generate heat when electricity is applied; and a sensing element disposed between the first transparent material and the second transparent material, the sensing element comprising two electrical leads, a filament having a resistivity that changes based on a temperature, and two portions of a substantially flat conductive material, wherein the filament comprises a first end and a second end, wherein the first end and the second end of the filament are each electrically coupled to one of the portions of substantially flat conductive material, and wherein each of the two electrical leads are electrically coupled to a portion of the substantially flat conductive material.

Clause 12: The heated window assembly of clause 11, wherein the first transparent material and the second transparent material comprise acrylic.

Clause 13: The heated window assembly of clauses 11 or 12, wherein the filament comprises a coil of filament wire wrapped around a winding card.

Clause 14: The heated window assembly of any of clauses 11 to 13, wherein the filament has a diameter of between 0.0015 inches and 0.0018 inches (0.0038 cm and 0.0046 cm).

Clause 15: The heated window assembly of any of clauses 11 to 14, wherein each of the two portions of substantially flat conductive material comprises a foil.

Clause 16: The heated window assembly of clause 15, wherein the foil comprises CuNi foil.

Clause 17: The heated window assembly of any of clauses 11 to 16, wherein the sensing element comprises a top layer and a bottom layer, and wherein the filament is disposed between the top layer and the bottom layer.

Clause 18: The heated window assembly of clause 17, wherein each of the two electrical leads comprises a bend disposed between the top layer and the bottom layer, and wherein a portion of each of the two electrical leads extends away from the sensing element and is external to the top layer and the bottom layer.

Clause 19: The heated window assembly of clauses 17 or 18, wherein the bend is substantially 90 degrees.

Clause 20: The heated window assembly of any of clauses 11 to 19, further comprising a control system adapted to be connected to the two electrical leads, the control system configured to determine a temperature based on resistance of the filament.

Clause 21: A sensing element for sensing a temperature of an electrically heated window, comprising; a top layer; a bottom layer; a coil of filament disposed between the top layer and the bottom layer, the coil of filament having a first end and a second end, wherein a resistivity of the coil of filament changes based on temperature; a first lead electrically connected to the first end of the coil of filament, the first lead comprising a first portion disposed between the top layer and the bottom layer, and a second portion external to the top layer and bottom layer, wherein the first portion comprises a bend; and a second lead electrically connected to the second end of the coil of filament, the second lead comprising a first portion disposed between the top layer and the bottom layer, and a second portion external to the top layer and bottom layer, wherein the first portion comprises a bend.

Clause 22: The sensing element of clause 21, further comprising: a first substantially flat conductive material, wherein the first end of the coil of filament is electrically coupled to the first substantially flat conductive material, and wherein the first substantially flat conductive material is electrically coupled to the first lead; and a second substantially flat conductive material, wherein the second end of the coil of filament is electrically coupled to the second substantially flat conductive material, and wherein the second substantially flat conductive material is electrically coupled to the second lead.

Clause 23: The sensing element of clause 22, wherein the first substantially flat conductive material and the second substantially flat conductive material comprise electrically conductive foil.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

Figure 1:
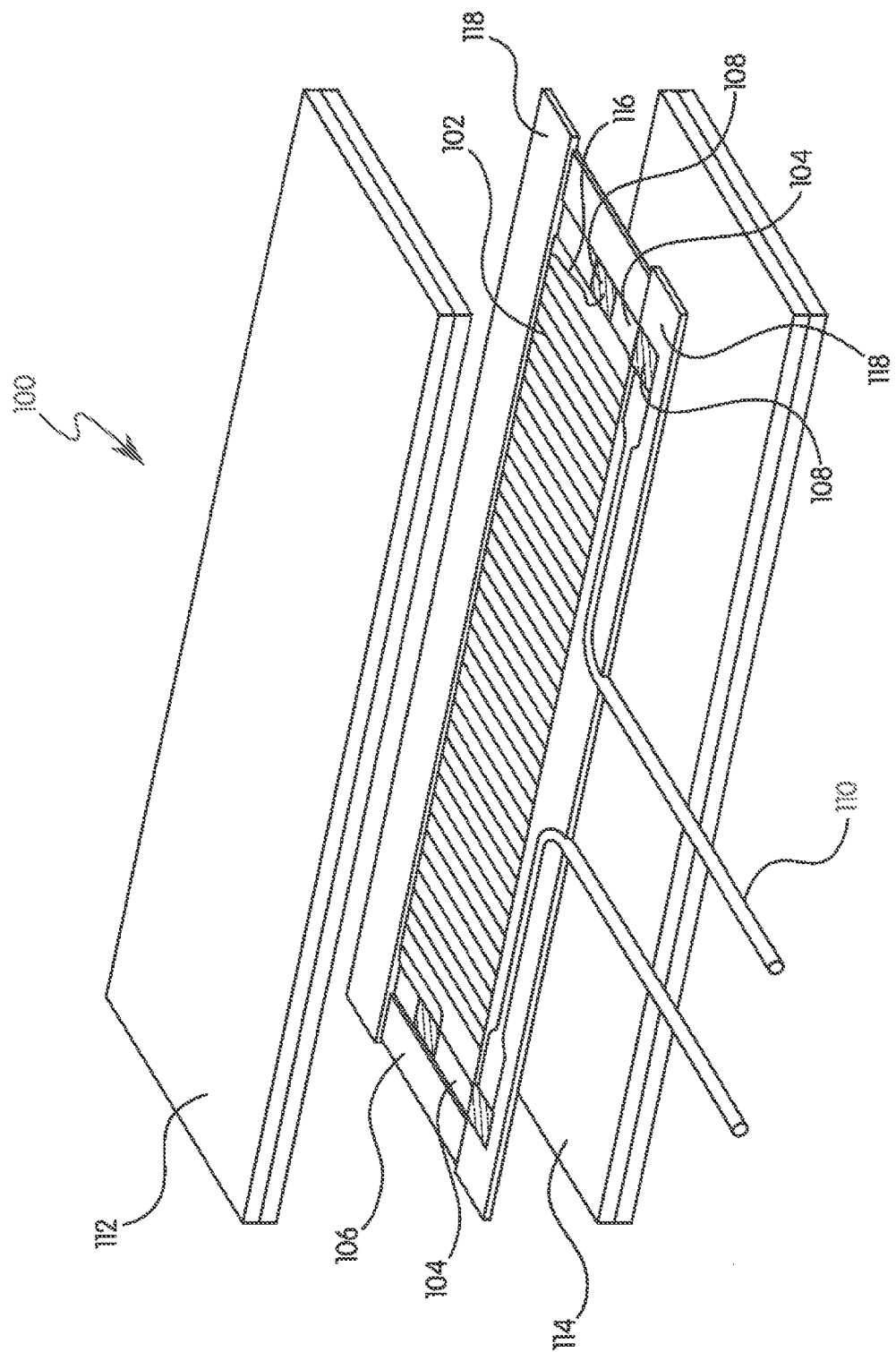
FIG. 1. illustrates an exploded view of a sensing element for a heated window according to the principles of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The term "electrically coupled", as used herein, refers to a direct or indirect electrical connection between two or more components or elements. For example, a first component may be electrically coupled to a second component if both components are indirectly connected through a third component that allows for signals or any form of electricity to flow between the first and second components. A first component may also be electrically coupled to a second component by means of a direct solder joint, twist-on wire connector, Printed Circuit Board (PCB) connection, and/or the like.

A sensing element is used in a heated window assembly that may be used, for example, in an aircraft where windows are prone to accumulating ice and/or fog due to exposure to extreme temperatures. It will be appreciated that other uses are also possible. The sensing element may be placed in a transparent interlayer material disposed between two or more outer plies of transparent material of a window assembly. One or more of the outer plies of transparent material may be coated with an electrically conductive material, such as a transparent conductive coating, that generates heat when electricity is applied to electrodes, bus bars, and/or other like power distribution devices. For example, the conductive coating can be applied to the interior side of one of the outer transparent plies such that the coating is adjacent both the interlayer and the outer ply. However, it will be appreciated that the conductive coating or other heating mechanism may be located at any effective location in the window assembly. The sensing element is used to measure the temperature of the heated window assembly so that the temperature can be regulated. Heated window assemblies and sensing elements are described by U.S. Pat. Nos. 3,789,191 and 3,789,192, which are hereby incorporated by reference in their entirety.

An exemplary sensing element 100 is shown in FIG. 1. The sensing element 100 includes a filament wire 102 wrapped around a winding card 106. The two ends of the filament wire 102 are electrically coupled to a substantially flat conductive material 104 at a solder joint 108. Two electrical leads 110 extend from the sensing element 100 and are also electrically coupled to the substantially flat conductive material 104 at another solder joint 108. The coil of filament wire 102 is disposed between a top layer 112 and a bottom layer 114 of the sensing element 100, such that the electrical leads 110 extend away from the sensing element 100.

With continued reference to FIG. 1, the filament wire 102 may be insulated and have a diameter that improves the tensile strength at the solder joint 108. For example, the diameter of the filament wire 102 may be approximately 0.0016 inches (0.004 cm) or greater. It will be appreciated, however, that any suitable filament wire 102 may be used. An expansion loop 116 may be located at both ends of the filament wire 102, between the coil of filament wire 102 and the solder joint 108, or other electrical connection to the substantially flat material 104. The expansion loops 116 provide flexibility for thermal expansion or contraction that may occur in an electrically heated window, thus reducing any temperature-induced stress that could lead to failure of the solder joint 108 or other electrical connection.

Still referring to FIG. 1, the top layer 112 and bottom layer 114 may be of various thicknesses, such that the sensing element 100 can be inserted into an interlayer material of a heated window assembly. Each of the top layer 112 and bottom layer 114 can include two layers of acrylic that are each approximately 0.003 inches (0.008 cm) thick. For example, Korad® acrylic film may be used as the top layer 112 and/or bottom layer 114. The dimensions of the top layer 112 and bottom layer 114 may be larger than the coil of filament wire 102 to fully encompass the coil. For example, the top layer 112 and bottom layer 114 may each be approximately 1.33 to 1.37 inches (3.38 cm to 3.48 cm) wide and 0.53 to 0.57 inches (1.35 cm to 1.45 cm) wide. However, it will be appreciated that different materials, thicknesses, and numbers of layers may be used that are appropriate for such an operating environment.

In the example shown in FIG. 1, the filament wire 102 is wrapped around the winding card 106 to form a coil. The winding card 106 may be any suitable material and dimension. For example, the winding card 106 may be a polycarbonate sheet approximately 0.01 inches (0.025 cm) thick and 0.3 inches (0.76 cm) wide. Further, spacers 118 may be disposal along the outer edge of the winding card 106 such that the winding card 106 and the spacers 118, taken together, are of a substantially similar dimension to the top layer 112 and bottom layer 114. Accordingly, the spacers 118 may have a thickness that is substantially similar to the thickness of the winding card 106. The spacers 118 may also be any suitable material such as, but not limited to, polycarbonate.

Referring to the example in FIG. 1, the substantially flat conductive material 104 can be a conductive foil. The conductive material 104 is electrically connected to the filament wire 102 and electrical leads 110. In this manner, the solder joint 108 electrically connects the filament wire 102 to the conductive material 104 instead of directly connecting the filament wire 102 with the electrical leads 110. A copper nickel (CuNi) foil may be used as the substantially flat conductive material 104, although it will be appreciated that other types of conductive foils and materials may also be used. The use of the substantially flat conductive material 104 allows for the filament wire 102 and electrical leads 110 to be electrically coupled while reducing the stress on the connection joints and, thus, preventing failure during operation.

As shown in FIG. 1, two electrical leads 110 extend from the sensing element 100. The electrical leads are each electrically connected to the respective substantially flat electrically conductive material 104 and, through the material 104, to separate ends of the filament wire 102. The electrical leads 110 may be any suitable material and have any suitable diameter. For example, the electrical leads 110 can be insulated copper wires having a gauge of 28 AWG (American Wire Gauge). It will be appreciated, however, that any type of wire or lead may be used. The electrical leads 110 extend away from the sensing element 100 and can be connected to a control system (not shown).

A portion of the electrical leads 110 extends along the spacers 118 and then outwardly at an angle. In this manner, a portion of the electrical leads 110 are encased by the top layer 112 and bottom layer 114 before extending outside of the sensing element 100. The encasement of a portion of the electrical leads 110 securely anchors the electrical leads 110 within the sensing element 100 and lessens the chance of a stress-induced failure. Moreover, the electrical leads include a bend to decrease the stress on the electrical connection to the conductive material 104 and, through the material 104, the filament wire 102. Thus, if the external portions of the electrical leads 110 are pulled or otherwise strained, the strain on the electrical connections will be diffused. Although FIG. 1 illustrates a substantially 90 degree bend in the electrical lead 110, one skilled in the art will appreciate that variations in the angle will also lessen any strain on the electrical connections. In the example shown in FIG. 1, the electrical leads 110 extend along the spacer 118 and the bent portion is on the spacer 118. In this manner, the bend is disposed and secured between the top layer 112 and bottom layer 114. The portions of the electrical leads 110 extending from the sensing element may be spaced apart as desirable for connection to a control system. For example, in FIG. 1 the extending portions of the electrical leads 110 are parallel and approximately 0.25 inches (0.64 cm) apart. Various other arrangements are possible.

Figure 2:
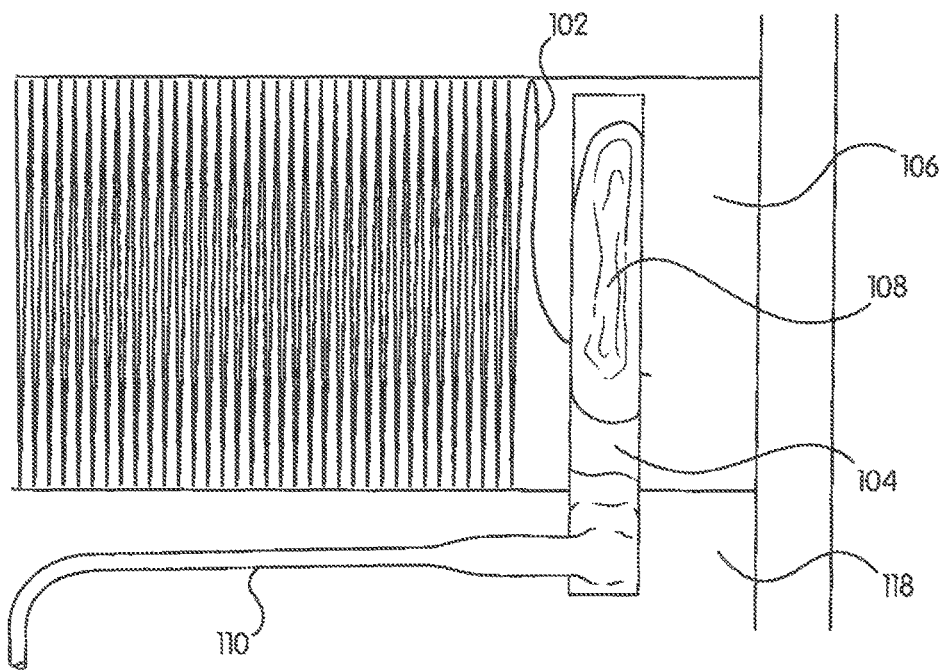
FIG. 2 illustrates a portion of a sensing element for a heated window according to the principles of the present invention.

Referring now to FIG. 2, a partial view of the sensing element 100 is shown. The filament wire 102 is shown wrapped around a winding card 106 and electrically coupled to the substantially flat electrically conductive material 104. The electrical lead 110 is shown electrically coupled to the material 104 via a solder joint 108 and extending substantially parallel to the coil of filament wire 102 along the spacer 118.

Figure 3:
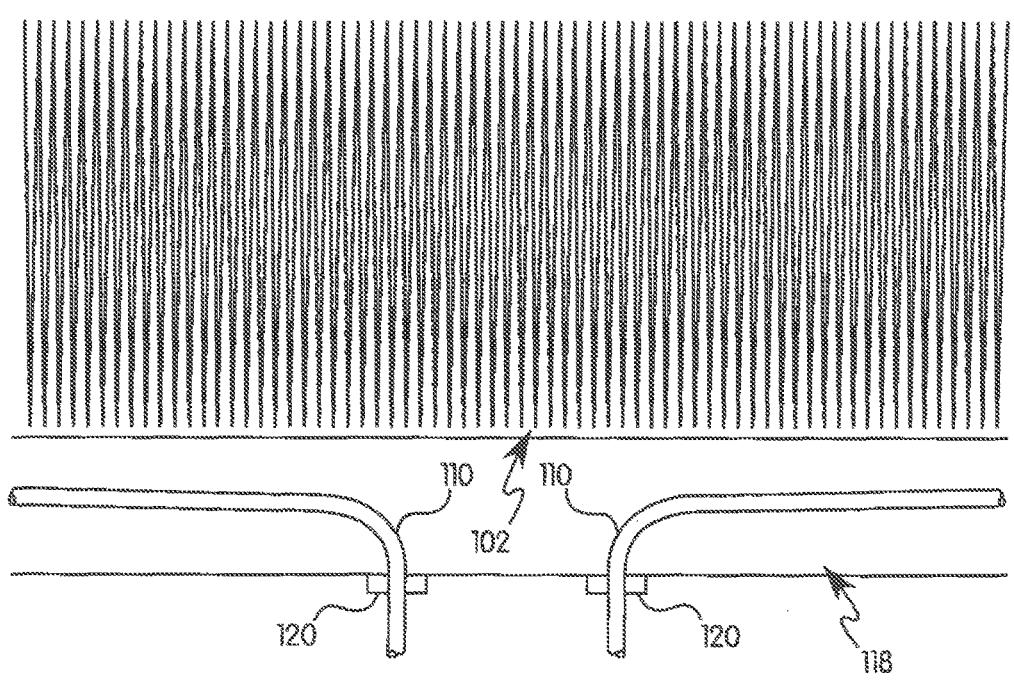
FIG. 3 illustrates another portion of a sensing element for a heated window according to the principles of the present invention.

Referring now to FIG. 3, another partial view of the sensing element 100 is shown. The electrical leads 110 are shown in FIG. 3 extending away from the coil of filament wire 102 at a substantially 90 degree angle. Two wire anchors 120 support the electrical leads 110 and hold them in place. The wire anchors 120 may be disposed on the spacer 118 and/or the winding card 106. It will be appreciated that the bend of the electrical leads 110 may be at any suitable angle to diffuse the stress on the solder joint.

The sensing element 100 can be capable of withstanding exposure to ambient temperatures ranging from −75 degrees F. to 160 degrees F. (−59 to 71 degrees C.). When inserted into the interlayer of a heated window assembly, the sensing element 100 is capable of withstanding conditions including pressures of up to 200 psi (1,378,952 Pa) at temperatures ranging from 70 degrees F. to 325 degrees F. (21 to 163 degrees C.). Moreover, since the sensing element is placed into the interlayer of a heated window assembly, it is capable of withstanding solar radiation exposure.

The electrical leads 110 may be coupled to a control system that determines temperature values from a detected electrical resistance. The coil of filament wire 102 acts as a resistor such that, the higher the temperature, the higher the electrical resistance. In this manner, a temperature control system can compute an actual temperature value using one or more algorithms. The equations and variables used may depend on the material of the filament wire 102. For example, for a filament wire made of 70% nickel and 30% iron, the Temperature Coefficient of Resistance (TCR) is $0.00474\Omega/\Omega/°$ C. nominal, $0.0044\Omega/\Omega/°$ C. minimum, and $00.49\Omega/\Omega/°$ C. maximum. In other words, TCR is an average resistance change per ° C. over a range of 0° C. to 100° C., divided by $R_{0°\ C.}$. TCR $(\Omega/\Omega/°\ C.)=((R_{100°\ C.}-R_{0°\ C.})/R_{0°\ C.}(100°\ C.-0°\ C.)$, where $R_{100°\ C.}$ is resistance at 100° C. and $R_{0°\ C.}$ is resistance at 0° C. Further, the unitless ratio of TCR of the nickel and iron filament wire may be 1.44 to 1.49, where TCR (unitless)=$(R_{100°\ C.}/R_{0°\ C.})$. The sensitivity of the filament wire ($\Omega/°$ C.) may be calculated where $\Omega/°$ C.=$(R_{100°\ C.}/R_{0°\ C.})/(100°\ C.-0°\ C.)$.

Although the invention has been described in detail for the purpose of illustration based on what is currently considered to be the most practical and preferred examples, it is to be understood that such detail is solely for that purpose and that the invention is not limited to the disclosed examples, but, on the contrary, is intended to cover modifications and equivalent arrangements that are within the spirit and scope of the appended claims. For example, it is to be understood that the present invention contemplates that, to the extent possible, one or more features of any example can be combined with one or more features of any other example.

The invention claimed is:

1. An encased sensing element for sensing a temperature of an electrically heated window, comprising:
    a coil of filament wire having a first end and a second end, the coil having a resistivity that changes based on temperature;
    a first substantially flat conductive member electrically coupled to the first end of the coil at a first solder joint;
    a second substantially flat conductive member electrically coupled to the second end of the coil at a second solder joint;
    a first lead wire electrically coupled to the first substantially flat conductive member at a third solder joint;
    a second lead wire electrically coupled to the second substantially flat conductive member at a fourth solder joint and extending outwardly from the fourth solder joint;
    at least one top layer and at least one bottom layer; and
    at least one spacer comprising a longitudinal edge contacting a longitudinal edge of the winding card and a top surface which is substantially co-planar with a top surface of the winding card, the at least one spacer being covered by the top layer and the bottom layer,
    wherein the first lead wire and the second lead wire each comprise an inwardly directed portion extending from the respective solder joint in an inward direction toward one another, an outwardly directed portion extending outwardly from the sensing element, and a bent portion extending therebetween,
    wherein the at least one top layer and the at least one bottom layer encase the solder joints and coil, and
    wherein at least the inwardly directed portion and the bent portion of the first lead wire and the second lead wire are disposed between the top surface of the at least one spacer and the top layer, thereby anchoring the inwardly directed portion and the bent portions of the lead wires in the sensing element to protect the solder joints from stress caused by forces applied to the lead wires.

2. The sensing element of claim 1, wherein the coil of filament is wrapped around a winding card formed from a first material, and wherein the top layer and the bottom layer comprise a second material different from the first material.

3. The sensing element of claim 2, wherein the second material comprises acrylic.

4. The sensing element of claim 1,
    wherein a spacer portion of the first substantially flat conductive member and a spacer portion of the second substantially flat conductive member are disposed on the top surface of the at least one spacer, and
    wherein the third solder joint and the fourth solder joint are disposed on the spacer portions of the first and second substantially flat conductive members.

5. The sensing element of claim 1, wherein the bent portion of the lead wires comprise a bend of substantially 90 degrees.

6. The sensing element of claim 1, wherein the inward direction is substantially parallel to the coil of filament wire.

7. The sensing element of claim 1, wherein the first substantially flat conductive member and the second substantially flat conductive member comprise conductive foil.

8. The sensing element of claim 7, wherein the conductive foil comprises CuNi foil.

9. The sensing element of claim 1, wherein the coil of filament comprises a filament wire having a diameter between 0.0015 inches and 0.0018 inches (0.0038 cm and 0.0046 cm).

10. A heated window assembly, comprising:
    a first transparent material;
    a second transparent material;
    a transparent interlayer disposed between the first transparent material and the second transparent material, wherein at least one of the interlayer, the first transparent material, and the second transparent material comprises an electrically conductive material adapted to generate heat when electricity is applied; and
    an encased sensing element disposed between the first transparent material and the second transparent material, the sensing element comprising a top layer, a bottom layer, two electrical leads, a coil filament having a resistivity that changes based on a temperature wrapped around a winding card, two portions of a substantially flat conductive material, and at least one spacer comprising a longitudinal edge contacting a longitudinal edge of the winding card and a top surface which is substantially co-planar with a top surface of the winding card, the at least one spacer being covered by the top layer and the bottom layer,
    wherein the filament comprises a first end and a second end, wherein the first end of the filament is electrically coupled to one of the portions of substantially flat conductive material at a first solder joint and the second end of the filament is electrically coupled to the other portion of the substantially flat conductive material at a second solder joint, wherein each of the two electrical leads is electrically coupled to a portion of the substantially flat conductive material at solder joints that are separate from the first solder joint and the second solder joint, wherein the two electrical leads each comprise an inwardly directed portion extending from the respective solder joint in an inward direction toward one another, an outwardly directed portion extending outwardly from the sensing element, and a bent portion extending therebetween, wherein the top layer and the bottom layer encase the solder joints and coil, and wherein at least the inwardly directed portion and the bent portion of the electrical leads are disposed between the top surface of the at least one spacer and the top layer, thereby anchoring the inwardly directed portion and the bent portion of the electrical leads in the sensing element to protect the solder joints from stress caused by forces applied to the electrical leads.

11. The heated window assembly of claim 10, wherein the first transparent material and the second transparent material comprise acrylic.

12. The heated window assembly of claim 10, wherein the filament has a diameter of between 0.0015 inches and 0.0018 inches (0.0038 cm and 0.0046 cm).

13. The heated window assembly of claim 10, wherein each of the two portions of substantially flat conductive material comprises a conductive foil.

14. The heated window assembly of claim 13, wherein the conductive foil comprises CuNi foil.

15. The heated window assembly of claim 10, wherein the filament is disposed between the top layer and the bottom layer.

16. The heated window assembly of claim 10, wherein the bent portion of the electrical leads comprises a bend of substantially 90 degrees.

17. The heated window assembly of claim 10, further comprising a control system adapted to be connected to the outwardly directed portion of the two electrical leads, the control system configured to determine a temperature based on resistance of the filament.

18. The heated window assembly of claim 10, wherein the solder joints which are directly connected to the two electrical leads are disposed between the top surface of the at least one spacer and the top layer.

19. A sensing element for sensing a temperature of an electrically heated window, comprising:
   a top layer;
   a bottom layer;
   a coil of filament wrapped around a winding card disposed between the top layer and the bottom layer, the coil of filament having a first end and a second end, wherein a resistivity of the coil of filament changes based on temperature;
   a first lead electrically connected to the first end of the coil of filament, the first lead comprising a first portion disposed between the top layer and the bottom layer, and a second portion external to the top layer and the bottom layer, wherein the first portion comprises a bend;
   a second lead electrically connected to the second end of the coil of filament, the second lead comprising a first portion disposed between the top layer and the bottom layer, and a second portion external to the top layer and the bottom layer, wherein the first portion comprises a bend;
   a first substantially flat conductive member, wherein the first end of the coil of filament is electrically coupled to the first substantially flat conductive member at a first solder joint, and wherein the first substantially flat conductive member is electrically coupled to the first lead at a third solder joint; and
   a second substantially flat conductive member, wherein the second end of the coil of filament is electrically coupled to the second substantially flat conductive member at a second solder joint, and wherein the second substantially flat conductive member is electrically coupled to the second lead at a third solder joint; and
   at least one spacer comprising an edge in contact with a longitudinal edge of the winding card and a top surface which is co-planar with a top surface of the winding card, the at least one spacer being covered by the top layer and the bottom layer,
   wherein the first lead wire extends from the third solder joint and the second lead wire extends from the fourth solder joint in directions which are substantially parallel to the coil of the filament wire,
   wherein the top layer and the bottom layer encase the first portion of the first lead and the first portion of the second lead to anchor the leads in the sensing element to protect the solder joints from stresses caused by forces applied to the second portions of the leads,
   wherein a portion of the first substantially flat conductive member and a portion of the second substantially flat conductive member are disposed on the top surface of the at least one spacer, and
   wherein the third solder joint and the fourth solder joint are disposed on the portions of the first and second substantially flat conductive members that are disposed on the top surface of the at least one spacer.

20. The sensing element of claim 19, wherein the first substantially flat conductive member and the second substantially flat conductive member comprise electrically conductive foil.

* * * * *